US006343737B1

(12) United States Patent
Adams

(10) Patent No.: US 6,343,737 B1
(45) Date of Patent: Feb. 5, 2002

(54) MAIL SLOT DOOR IMMOBILIZER

(75) Inventor: Dwayne Roger Adams, Orange, CA (US)

(73) Assignee: Security Accessories Corp., Orange, CA (US)

(*) Notice: Subject to any disclaimer, the term of this patent is extended or adjusted under 35 U.S.C. 154(b) by 0 days.

(21) Appl. No.: 09/558,451

(22) Filed: Apr. 25, 2000

(51) Int. Cl.[7] .................... B65G 11/04

(52) U.S. Cl. .................... 232/45; 232/19; 232/44; 292/289

(58) Field of Search .................... 232/17, 45, 46, 232/44, 19, 22, 23; 292/288, 289, DIG. 50, 258; 109/66, 77

(56) References Cited

U.S. PATENT DOCUMENTS

| | | | | |
|---|---|---|---|---|
| 1,423,251 A | | 7/1922 | Pennig | |
| 1,482,459 A | | 2/1924 | Cahan | |
| 1,846,762 A | | 2/1932 | Scantlebury | |
| 3,134,146 A | | 5/1964 | Geoghegan | |
| 3,975,041 A | * | 8/1976 | Edison | 292/288 X |
| 4,098,454 A | | 7/1978 | Easter | |
| 4,333,603 A | * | 6/1982 | Carlson | 232/17 |
| 4,557,470 A | * | 12/1985 | Link | 403/344 X |
| 5,921,117 A | * | 7/1999 | Illguth | 232/17 X |
| D443,125 S | | 5/2001 | Adams | |

* cited by examiner

*Primary Examiner*—B. Dayoan
*Assistant Examiner*—William L. Miller
(74) *Attorney, Agent, or Firm*—Knobbe, Martens, Olson & Bear LLP

(57) ABSTRACT

A mail slot door immobilizer for immobilizing a mail slot door within a main door, including an interior portion located on an interior side of the mail slot door and overlapping the mail slot door and the main door, and an exterior portion located on an exterior side of the mail slot door and overlapping the mail slot door and the main door. A fastener removably fastens the interior portion to the exterior portion to clamp the mail slot door and the main door between the interior and exterior portions and to prevent movement of the mail slot door with respect to the main door.

13 Claims, 3 Drawing Sheets

MAIL SLOT DOOR IMMOBILIZER

FIELD OF THE INVENTION

The invention relates to building security devices and, more particularly, to devices for immobilizing a mail slot door of a building to prevent access to the building through the mail slot door.

BACKGROUND OF THE INVENTION

It is common for commercial buildings to have a mail slot for allowing mail to be delivered into the building. Typically, such mail slots are located in the front door of the building and are covered by a mail slot door. The mail slot door rotates on a hinge and can be opened to allow mail to be inserted through the mail slot.

While such mail slot arrangements are often necessary to allow mail to be received by the building occupant, they may also allow unwanted or unsolicited items to be delivered into the building, such as trash or unwanted advertising materials. In addition to requiring cleanup, these materials may accumulate on the inside of the building and be seen by passersby through store windows or glass doors. The accumulation can be unsightly and can reflect poorly on the building occupant.

In some cases, it may be possible to reach through the mail slot to the interior of the building to reach a panic bar or to unlock the door. In order to prevent unwanted access to the building in such cases, it is necessary to prevent the mail slot door from being opened.

Thus, a need exists for a device that can be installed to prevent the unwanted opening of a mail slot door and yet be easily removed when desired to allow mail to be delivered into the building.

SUMMARY OF THE INVENTION

The mail slot door immobilizer of the present invention is a removable device that prevents the unwanted opening of a mail slot door located within a main door. The mail slot door immobilizer includes an interior portion located on an interior side of the mail slot door and overlapping the mail slot door and the main door, and an exterior portion located on an exterior side of the mail slot door and overlapping the mail slot door and the main door. A fastener removably fastens the interior portion to the exterior portion to clamp the mail slot door and the main door between the interior and exterior portions and to prevent movement of the mail slot door with respect to the main door.

An important aspect of the invention is that the mail slot door immobilizer is tamper resistant. In a preferred embodiment of the mail slot door immobilizer, the fastener extends through the mail slot door from the interior portion to the exterior portion. The exterior portion is provided with an opening which extends only partially through the exterior portion. The opening has a retaining surface which cooperates with a retaining surface of the fastener to retain the fastener within the opening. Because the opening extends only partially through the exterior portion, the fastener is not visible from the exterior side of the mail slot door, thereby discouraging tampering with the fastener.

Another aspect of the invention is the ease of installation and removal of the mail slot door immobilizer. The mail slot door immobilizer can be installed on existing mail slot doors. Once installed, the mail slot door immobilizer can easily be removed and replaced.

Another aspect of the invention is the relatively small surface area of the exterior portion of the mail slot door immobilizer. The mail slot door immobilizer is intended to be used primarily in commercial buildings. It is important to owners and occupants of such buildings that the overall appearance of the building or storefront not be degraded. The relatively small surface area of the exterior portion minimizes the impact of the mail slot door immobilizer on the appearance of the main door. It also facilitates the manufacture of the mail slot door immobilizer at low cost.

DETAILED DESCRIPTION OF THE PREFERRED EMBODIMENT

Figure 1:
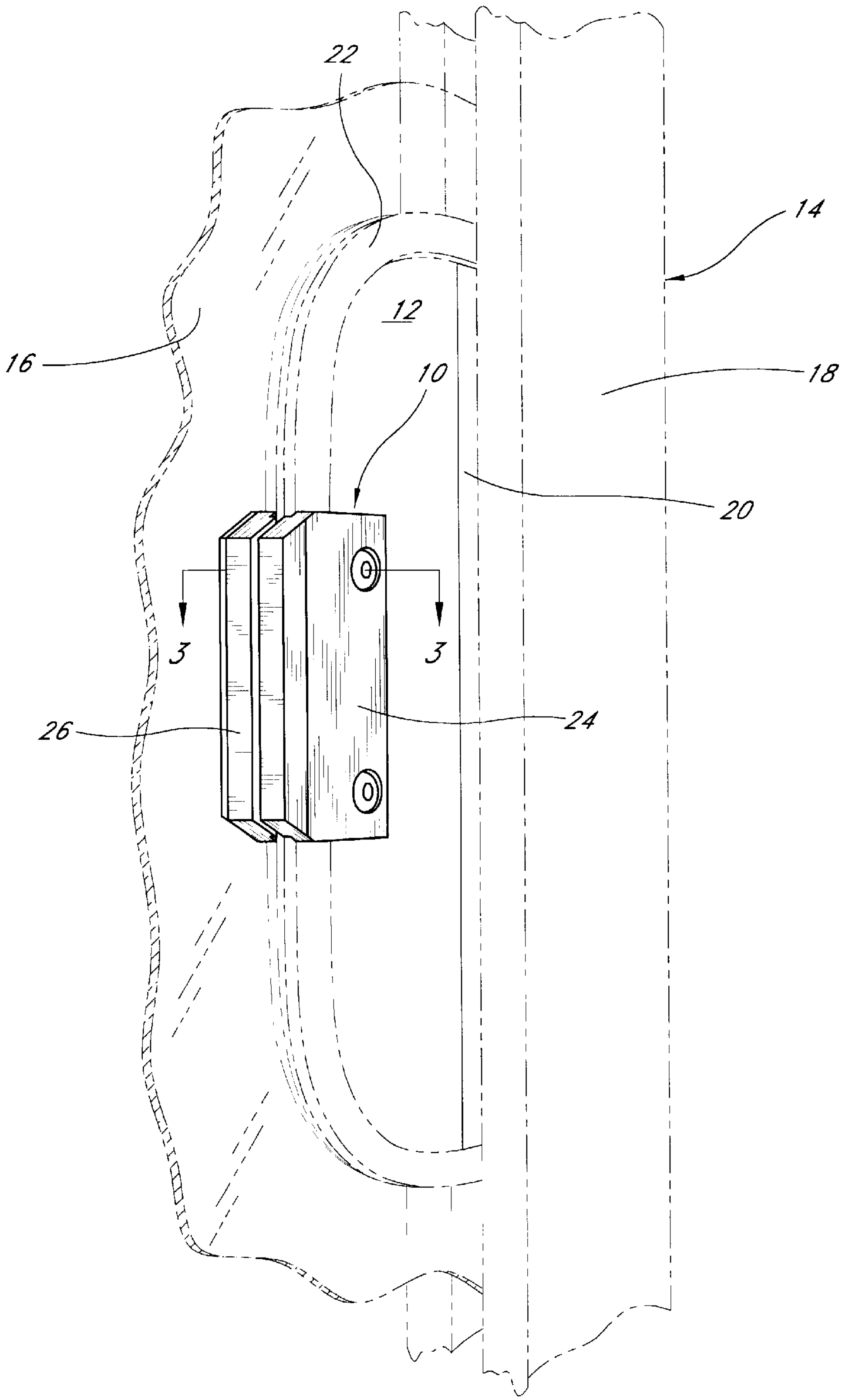
FIG. 1 is a perspective view of a mail slot door immobilizer in accordance with the present invention mounted on a mail slot door of a main door.

A mail slot door immobilizer in accordance with the present invention is illustrated in FIG. 1. The mail slot door immobilizer 10 is shown mounted on a mail slot door 12. The mail slot door 12 is located within a main door 14 having a glass interior 16 and an aluminum frame 18.

The arrangement of the mail slot door 12 and main door 14 shown in FIG. 1 is typical in commercial buildings. The mail slot door 12 rotates on a hinge 20 located adjacent the frame 18 of the main door 14. A mail slot door frame 22 surrounds the perimeter of the mail slot door 12 and is secured to the glass interior 16 of the main door 14. The mail slot door 12 is opened by rotating it about the hinge 20 with respect to the mail slot door frame 22 and main door 14.

Figure 2:
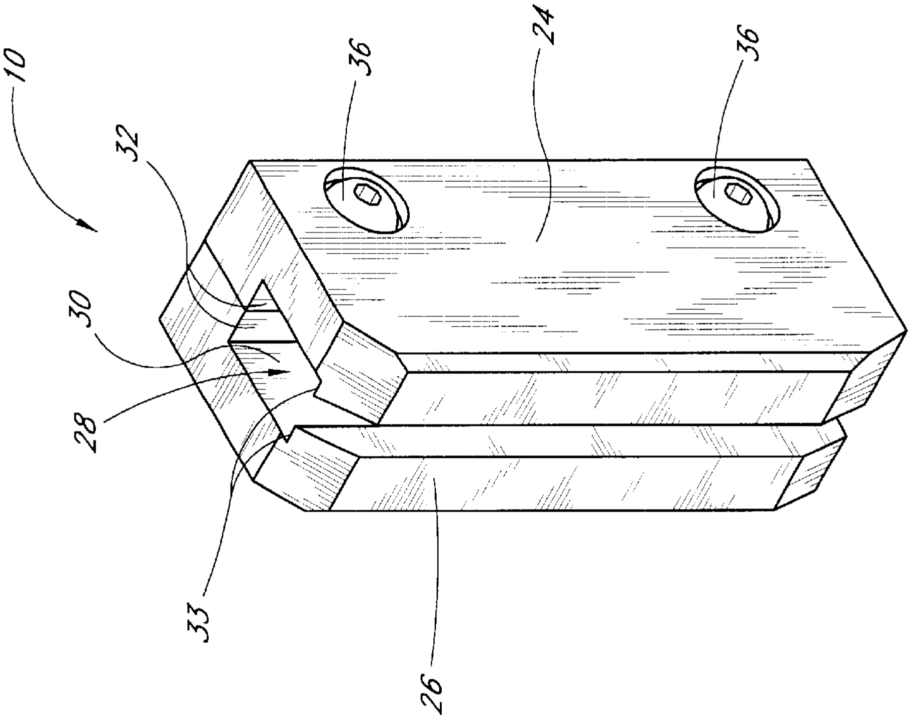
FIG. 2 is a perspective view of the mail slot door immobilizer of FIG. 1.
Figure 4:
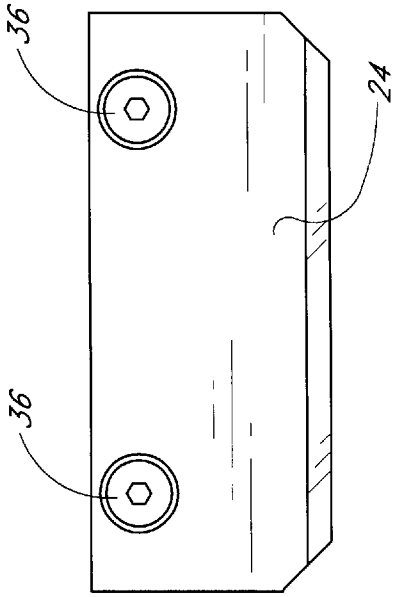
FIG. 4 is a front elevational view of the mail slot door immobilizer of FIG. 1.
Figure 5:
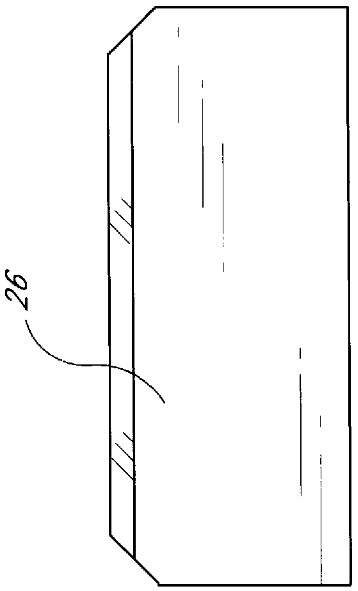
FIG. 5 is a rear elevational view of the mail slot door immobilizer of FIG. 1.

Referring to FIG. 2, the mail slot door immobilizer 10 includes an interior portion 24 and an exterior portion 26. The interior and exterior portions 24, 26 are preferably fabricated from aluminum to blend with the appearance of a standard aluminum and glass door, but may be fabricated from any material of sufficient strength to resist bending or breaking by screwdrivers or similar items.

Figure 3:
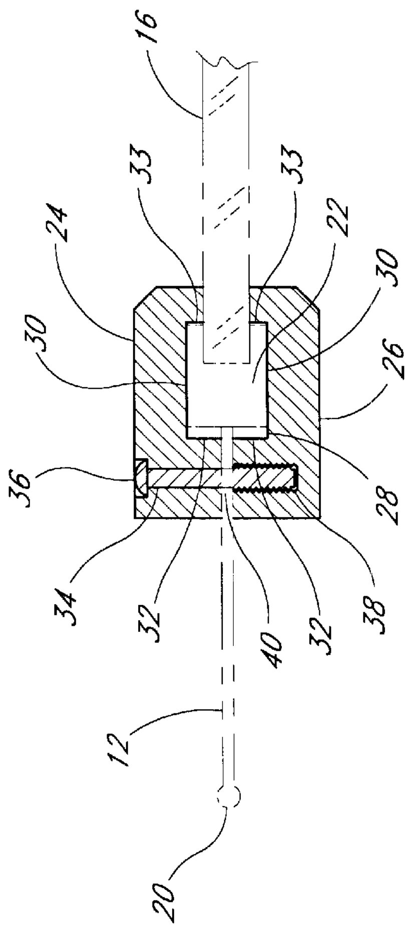
FIG. 3 is a horizontal cross-sectional view of the mail slot door immobilizer taken along the line 3—3 in FIG. 1.

Each of the interior and exterior portions 24, 26 has a recessed area 28 defined by a base surface 30 and opposing wall surfaces 32, 33. The interior portion 24 is positioned on the interior side of the mail slot door 12 so that it overlaps both the mail slot door 12 and the glass interior 16 of the main door 14, as shown in FIGS. 1 and 3. The mail slot door frame 22 fits within the recessed area 28 of the interior portion 24.

Referring to FIG. 3, the interior portion 24 is provided with openings 34 extending therethrough for receiving threaded fasteners 36. The threaded fasteners 36 may be of any suitable type, such as standard, Phillips head, or Allen-type machine screws.

To install the mail slot door immobilizer 10, holes 40 are drilled in the mail slot door 12 in register with the openings 34 in the interior portion 24. Preferably, the holes 40 have a diameter only slightly greater than the diameter of the fasteners 36. The interior portion 24 may be used as a template to mark the proper locations for the holes 40. The interior portion 24 is then removed and the holes 40 are drilled through the mail slot door 12 at the marked locations.

Referring still to FIG. 3, the exterior portion 26 is provided with threaded openings 38 which extend only partially through the exterior portion 26. The exterior portion 26 is positioned on the exterior side of the mail slot door 12 so that the threaded openings 38 are in register with the holes 40 in the mail slot door 12 and the openings 34 in the interior portion 24. The fasteners 36 are inserted from the interior side through the openings 34 in the interior portion 24 and the holes 40 in the mail slot door 12. The fasteners 36 extend into the threaded openings 38 in the exterior portion 26 and engage the threads of the threaded openings 28 to removably fasten the interior portion 24 to the exterior portion 26.

The mail slot door immobilizer 10 prevents the mail slot door 12 from rotating with respect to the main door 14 by clamping the mail slot door 12 and main door 14 between the interior and exterior portions 24, 26. The mail slot door 12 is not allowed to rotate about the hinge 20 toward the interior because the base surface 30 of the exterior portion 26 abuts the mail slot door frame 22. Likewise, the mail slot door 12 is prevented from rotating toward the exterior because the base surface 30 of the interior portion 24 abuts the mail slot door frame 22.

An important aspect of the invention is that the mail slot door immobilizer 10 is tamper resistant. Because the threaded openings 38 extend only partially through the exterior portion 26, the fasteners 36 are not visible from the exterior side. As a result, tampering with the fasteners 36 is discouraged. Because the locations of the fasteners 36 are not evident from the exterior side, disabling of the mail slot door immobilizer 10 by drilling out the fasteners 36 is made more difficult.

The mail slot door immobilizer 10 is also resistant to tampering by prying of the exterior portion 26. Preferably, the recessed area 28 is sized so that the base surface 30 of the exterior portion 26 abuts the mail slot door frame 22 when the fasteners 36 are fully tightened. As a result, it would be difficult to insert a screwdriver or other tool between the base surface 30 and mail slot door frame 22 in order to pry the exterior portion 26 from the mail slot door 12. However, even if it is possible to insert a screwdriver between the base surface 30 and the mail slot door frame 22, it would be difficult to pry the exterior portion 26 from the top or bottom because the fasteners 36 are engaged near the top and bottom of the exterior portion 26. Thus, the lever arm created between the top or bottom of the exterior portion 26 and associated fastener 36 would be fairly insignificant.

The exterior portion 26 is relatively narrow horizontally. Desirably, the width of the exterior portion 26 is between 0.50 and 5.00 inches. More desirably, the width of the exterior portion 26 is between 0.75 and 3.00 inches. The width of the exterior portion is preferably 1.25 inches. Because the exterior portion 26 is relatively narrow, the lever arm created between either side of the exterior portion 26 and the fasteners 36 would likewise be fairly insignificant, thus making it difficult to pry the exterior portion 26 from either side.

The interior and exterior portions 24, 26 are relatively thick in a direction perpendicular to the plane of the mail slot door 12. Desirably, the thickness of each of the interior and exterior portions 24, 26 is between 0.25 and 1.00 inches. More desirably, the thickness of each of the interior and exterior portions 24, 26 is between 0.40 and 0.75 inches. The thickness of each of the interior and exterior portions 24, 26 is preferably 0.48 inches. Because of the thickness of each of the interior and exterior portions 24, 26, and the resulting strength of the mail slot door immobilizer 10, any attempt to pry the exterior portion 26 from the mail slot door 12 would likely cause the glass interior 16 of the main door 14 to break.

The mail slot door immobilizer 10 also prevents opening of the mail slot door 12 by bending or bowing it. The holes 40 in the mail slot door 12 and fasteners 36 extending therethrough provide a secure attachment of the mail slot door 12 to the mail slot door immobilizer 10. When the mail slot door 12 is bowed inwardly, the base surface 30 and wall surface 33 of the exterior portion 26 abut the mail slot door frame 22, thereby preventing further bowing of the mail slot door 12. Likewise, when the mail slot door 12 is bowed outwardly, the base surface 30 and wall surface 33 of the interior portion 24 abut the mail slot door frame 22.

In addition, the interior and exterior portions 24, 26 are of sufficient height relative to the mail slot door 12 to prevent bowing of the mail slot door 12 at the top and bottom thereof. Desirably, the height of each of the interior and exterior portions 24, 26 is between 1.00 and 6.00 inches. More desirably, the height of each of the interior and exterior portions 24, 26 is between 2.00 and 4.00 inches. The height of each of the interior and exterior portions 24, 26 is preferably 3.00 inches.

Another aspect of the invention is the ease of installation and removal of the mail slot door immobilizer 10. The mail slot door immobilizer 10 fits most existing mail slot door arrangements of the type shown in FIG. 1. Installation of the mail slot door immobilizer 10 requires only the drilling of two small holes 40 in the mail slot door 12. Once installed, the mail slot door immobilizer 10 can be removed and replaced simply by inserting or removing the fasteners 36 with a standard screwdriver or Allen wrench.

A further aspect of the invention is the relatively small surface area of the exterior portion 26 of the mail slot door immobilizer 10. The mail slot door immobilizer 10 is intended to be used primarily in commercial buildings. It is important to owners and occupants of such buildings that the overall appearance of the building or storefront not be degraded. Desirably, the area of the surface of the exterior portion 26 which is parallel to the mail slot door 12 and main door 14 and which faces away from the mail slot door 12 and main door 14 is between 0.50 and 30.00 square inches. More desirably, the area of the surface of the exterior portion 26 which is parallel to the mail slot door 12 and main door 14 and which faces away from the mail slot door 12 and main door 14 is between 1.50 and 12.00 square inches. Preferably, this surface area is 3.75 square inches. Because of the relatively small surface area of the mail slot door immobilizer 10, its impact on the appearance of the main door 14 is minimized, and the low-cost manufacture of the mail slot door immobilizer 10 is facilitated.

It will be apparent to those skilled in the art that some modification of the disclosed embodiment may be possible without departing from the spirit of the invention. For example, other means may be used to fasten the interior portion 24 to the exterior portion 26. Instead of the threaded fasteners 36, for example, a key lock in the interior portion 24 may be used to selectively engage a surface of the exterior portion 26 and thereby removably fasten the interior portion 24 to the exterior portion 26. Therefore, the foregoing description is considered to be exemplary, and the true scope of the invention is that defined in the following claims.

What is claimed is:

1. An apparatus, comprising:

a main door;

a mail slot door within the main door; and a mail slot door immobilizer, comprising:

an interior portion located on an interior side of the mail slot door and overlapping the mail slot door and the main door;

an exterior portion located on an exterior side of the mail slot door and overlapping the mail slot door and the main door; and a fastener for removably fastening the interior portion to the exterior portion to clamp the mail slot door and the main door between the interior and exterior portions and to prevent movement of the mail slot door with respect to the main door.

2. The apparatus of claim 1, wherein the fastener extends through the mail slot door from the interior portion to the exterior portion.

3. The apparatus of claim 2, wherein the exterior portion is provided with an opening to receive the fastener, the opening having a first retaining surface and the fastener having a second retaining surface, the first and second retaining surfaces cooperating to form an interference fit to retain the fastener within the opening.

4. The apparatus of claim 3, wherein the opening and fastener extend only partially through the exterior portion so that the fastener is not visible from the exterior side of the mail slot door, thereby deterring tampering with the fastener.

5. The apparatus of claim 1, wherein the width of the exterior portion is between 0.50 and 5.00 inches.

6. The apparatus of claim 1, wherein the width of the exterior portion is between 0.75 and 3.00 inches.

7. The apparatus of claim 1, wherein the thickness of each of the interior and exterior portions is between 0.25 and 1.00 inches.

8. The apparatus of claim 1, wherein the thickness of each of the interior and exterior portions is between 0.40 and 0.75 inches.

9. The apparatus of claim 1, wherein the height of each of the interior and exterior portions is between 1.00 and 6.00 inches.

10. The apparatus of claim 1, wherein the height of each of the interior and exterior portions is between 2.00 and 4.00 inches.

11. The apparatus of claim 1, wherein the area of the surface of the exterior portion which is parallel to the mail slot door and main door and which faces away from the mail slot door and main door is between 0.50 and 30.00 square inches.

12. The apparatus of claim 1, wherein the area of the surface of the exterior portion which is parallel to the mail slot door and main door and which faces away from the mail slot door and main door is between 1.50 and 12.00 square inches.

13. A method of immobilizing a mail slot door within a main door, comprising the steps of:

positioning an interior portion of a mail slot door immobilizer on an interior side of the mail slot door so that the interior portion overlaps the mail slot door and the main door;

positioning an exterior portion of the mail slot door immobilizer on an exterior side of the mail slot door so that the exterior portion overlaps the mail slot door and the main door;

removably attaching the interior portion to the exterior portion to clamp the mail slot door and the main door between the interior and exterior portions and to prevent movement of the mail slot door with respect to the main door.

* * * * *